| United States Patent [19] | [11] | 4,172,824 |
|---|---|---|
| Harrington, Jr. et al. | [45] | Oct. 30, 1979 |

[54] COPOLYESTER MELT ADHESIVE HAVING IMPROVED FLOW CHARACTERISTICS CONTAINING DI- AND TRI-BENZOATE MODIFIER

[75] Inventors: Robert C. Harrington, Jr., Kingsport; James D. Hood, Blountville, both of Tenn.

[73] Assignee: Eastman Kodak Company, Rochester, N.Y.

[21] Appl. No.: 909,909

[22] Filed: May 26, 1978

[51] Int. Cl.² .......................... C08J 3/18; C08L 67/02
[52] U.S. Cl. .............................. 260/31.2 XA; 428/261; 260/31.6
[58] Field of Search ....................... 260/31.6, 31.2 XA

[56] References Cited

U.S. PATENT DOCUMENTS

| 2,044,612 | 7/1936 | Jaeger | 260/31.2 N |
| 3,039,982 | 6/1962 | DeWitt | 260/31.2 XA |
| 3,186,961 | 6/1965 | Sears | 260/30.6 R |
| 3,669,921 | 6/1972 | Droke et al. | 260/75 R |
| 3,970,631 | 7/1976 | Backsai | 260/31.6 |

FOREIGN PATENT DOCUMENTS 893153 2/1972 Canada ..................................... 156/332

*Primary Examiner*—Joseph L. Schofer
*Assistant Examiner*—Peter F. Kulkosky
*Attorney, Agent, or Firm*—John F. Stevens; Daniel B. Reece, III

[57] ABSTRACT

The flow characteristics of a copolyester melt adhesive prepared from terephthalic acid, adipic acid, ethylene glycol and 1,4-butanediol are improved by the use of a modifying amount of glycerol tribenzoate, neopentyl dibenzoate, triethylene glycol dibenzoate, trimethylolethane tribenzoate, or mixtures thereof.

10 Claims, No Drawings

COPOLYESTER MELT ADHESIVE HAVING IMPROVED FLOW CHARACTERISTICS CONTAINING DI- AND TRI-BENZOATE MODIFIER

BACKGROUND OF THE INVENTION

1. Field of the Invention

This invention relates generally to copolyester melt adhesives, and more specifically, this invention relates to particular copolyester melt adhesives containing benzoic acid esters as modifiers for improving flow characteristics.

2. Description of Prior Art

U.S. Pat. No. 3,669,921, incorporated herein by reference, relates to copolyester melt adhesives derived from terephthalic acid, adipic acid, ethylene glycol and 1,4-butane-diol, or derivatives of these components. These melt adhesives are especially useful in the bonding of fabrics for upholstered items, glass, wood, rubber, plastic sheeting, metal, etc., either to themselves or to other materials. These copolyester melt adhesives are effective in resisting extended contact with dry cleaning and other solvents, and permit increased production rates in various applications. The use of specific amounts of either titanium dioxide or sodium stearate in these copolyesters was found to prevent loss of bond strength due to ageing, and therefore extended the life of the adhesive. This patent states that dyes or dye-receptive agents, color stabilizers, and various other adjuvants may be added to the copolyester adhesives to meet certain specific use requirements. No mention is made of the use of benzoic acid esters as modifiers for improving flow characteristics.

Benzoic acid esters are known for use in polymers. U.S. Pat. No. 3,186,961 discloses the use of various aryl carboxylic acid esters, for example, diethylene glycol dibenzoate, triethylene glycol dibenzoate, etc., in aromatic polyesters of carbonic acid. U.S. Pat. No. 2,044,612 discloses the use of certain benzoates as plasticizers for plastics, including condensation products of polyhydric alcohols and polybasic acids. Canadian Pat. No. 919,190 and British Pat. No. 815,991 also disclose the use of benzoic acid esters as plasticizers for vinyl resins. These patents, however, do not suggest the use of the particular benzoates specified herein for use as modifiers of the particular polyester melt adhesive claimed.

SUMMARY OF THE INVENTION

In accordance with this invention, copolyester adhesives derived from terephthalic acid, adipic acid, ethylene glycol and 1,4-butanediol, or derivatives thereof are modified with esters of benzoic acid to improve melt flow characteristics. The benzoic acid esters are glyceryl tribenzoate, neopentyl dibenzoate, triethylene glycol dibenzoate, trimethylolethane tribenzoate or mixtures thereof. Use of these modifiers lowers the melt viscosity such that the adhesive has improved flow characteristics, allowing less sophisticated application equipment and lower application temperatures usually without heating the substrate prior to application, and usually without lowering the adhesive strength. Lowering of the viscosity is surprising because compatible flow additives for high performance copolyester adhesives of the type disclosed herein are rare. For example, polyesters of 100 mol percent terephthalic acid, 80 mol percent 1,6-hexanediol and 20 mol percent 1,4-butanediol have been found to be not compatible with the benzoic acid esters disclosed herein.

DETAILED DESCRIPTION OF THE INVENTION

The copolyester melt adhesive according to this invention is blended with a modifying amount of at least one of glyceryl tribenzoate, neopentyl dibenzoate, triethylene glycol dibenzoate or trimethylolethane tribenzoate. These benzoic acid esters are well known to those skilled in the art as compositions of matter and are commercially available. Normally, a modifying amount will be within the range of about 1 to about 35 parts modifier per hundred parts polyester. Usually, about 5 to about 15 parts modifier are used.

The copolyester is derived from components (1), (2), (3) and (4) as follows:

(1) terephthalic acid or derivatives thereof;
(2) adipic acid or derivatives thereof;
(3) ethylene glycol or derivatives thereof; and
(4) 1,4-butanediol or derivatives thereof, wherein the acid components and the diol components are present in a 1:1 molar ratio, the copolyester having a mole ratio of terephthalic acid to adipic acid within the range of about 60:40 to about 80:20, a mole ratio of ethylene glycol to 1,4-butanediol within the range of about 60:40 to about 80:20, a softening point within the range of about 80°–160° C., and an inherent viscosity of at least 0.5 as measured at 25° C. using 0.25 gram of copolyester per 100 ml. of a solvent consisting of 60 percent by weight phenol and 40 percent by weight tetrachloroethane.

In an especially preferred embodiment of the invention there is provided a hot melt adhesive composition comprising the copolyester defined above except that the mole ratios of terephthalic acid to adipic acid is about 75:25, the mole ratio of ethylene glycol to 1,4-butanediol is about 75:25, the softening point is within the range of about 90°–150° C., and the inherent viscosity is from about 0.5 to about 1.0, preferably about 0.80.

The copolyesters of this invention may be prepared by standard procedures well known to those skilled in the art. See, for example, British Pat. No. 1,047,072. For example, these copolyesters may be prepared by employing such amounts of terephthalic acid, adipic acid, ethylene glycol and 1,4-butanediol according to such polymerization conditions as will result in the production of a copolyester in which the mole ratio of terephthalic acid to adipic acid will be within the range of 60:40 to 80:20, the range of ethylene glycol to 1,4-butanediol will be in the range of 60:40 to 80:20, and the inherent viscosity (I.V.) will be greater than 0.5. It has been found that the higher the I.V. of the copolyester material, the greater the bond strength will be resulting from its use in laminating fabrics and other substrates, as revealed by the so-called "Peel-Test", the details of which are described hereinafter. In general, the copolyesters of this invention in which the mole ratios of terephthalic acid to adipic acid are within the range of 60:40 to 80:20 and ethylene glycol to 1,4-butanediol within the range of 60:40 to 80:20 are characterized by softening points ranging from about 80° C. to about 160° C.

The modifier may be mixed with the copolyester using conventional techniques, such as, for example, melt blending followed by extruding and subsequent pelletizing.

As indicated above, when copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

The term "improve flow characteristics" is used herein to mean a lowering of the viscosity of the melted adhesive.

T-PEEL TEST (METAL STRIPS)

Three sets of two aluminum strips are prepared, each strip being 6 inches long, 1 inch wide and 0.012 inch thick and polished on one surface. These strips are cleaned with an appropriate solvent, such as acetone, and dried. One strip of each set is coated along 2 inches of its length in the following manner with the copolyester material under test, leaving 4 inches of the strip uncoated. Pellets of the copolyester adhesive are distributed evenly over the polished surface of one of the metal strips in each set, the strip bearing the pelleted material then placed on a hot plate and heated to a temperature sufficient to melt the copolyester material, as for example, about 135° C. This temperature occasions flowing of the copolyester material which is thus evenly distributed to form a homogeneous layer a few thousandths of an inch thick. The coated strip is then cooled, another uncoated strip of the same dimensions is superimposed on the adhesive layer of the coated strip with the polished side in contact with the adhesive and the resulting assembly placed on a hot plate and the assembly heated to about 135° C. While the assembly is still on the hot plate, moderate pressure is applied to the upper metal strip, thus spreading the adhesive material between the strips to a uniform thickness of about 0.008 inch.

The laminated products thus produced are then each subjected to a peel test to determine the amount of force required to separate the adhered metal strips one from another. The test strip (6 inches long, 1 inch wide and 0.012 inch thick and laminated by means of the copolyester adhesive along 2 inches of its length) is conditioned for 24 hours at about 73° F. and 50 percent relative humidity.

The uncoated ends of the laminated strip thus produced are placed in the jaws of an Instron testing machine and the laminated strip is pulled apart at a specified jaw separation rate. Each of the three laminated strips is tested in this manner and the force in pounds required to pull the strip apart is recorded for each sample and averaged for the three tests.

The above described copolyesters are especially useful as melt adhesives in bonding fabrics of natural and manmade fibers such as those produced from polyesters, rayon, cellulose acetate and cotton, as well as in bonding of other laminated products. As indicated above, these copolyesters are particularly characterized by their ability to withstand the action of heat, steam and dry cleaning liquids, such as hot perchloroethylene. Also, these adhesives are useful in bonding metal, glass, wood, rubber, plastic, etc., either to themselves or to other materials.

Although the procedures employed for the lamination or bonding of fabrics, metals and other substrates and the methods of testing bond strengths are in general well known to those skilled in the art, the following examples are included for a better understanding of the invention.

The melt index is measured in accordance with ASTM D-1238 using 82.5 mils diameter orifice. Melt index is considered a good measurement of flow characteristics or viscosity. The higher the melt index, the better the flow characteristics, or, the lower the viscosity. Grab strength (Examples 11–39) is measured in accordance with ASTM D-1683 with seams pulled at 12 inches per minute.

The examples which follow are submitted for a better understanding of the invention. In the examples, the copolyester is prepared using conventional esterification, ester interchange and polycondensation techniques in a continuous melt phase system from the following ingredients:

| | |
|---|---|
| terephthalic acid (from dimethyl terephthalate) | - 75 mol % |
| adipic acid | - 25 mol % |
| ethylene glycol | - 75 mol % |
| 1,4-butanediol | - 25 mol % |

EXAMPLE 1

One hundred parts of the copolyester described above are modified with 10 parts of glyceryl tribenzoate by mixing in a continuous Banbury mixer, extruding, and subsequently pelletizing. These pellets are then checked for viscosity change at 190° C. and compared with unplasticized copolyester by determination of the melt index as follows:

| | Copolyester | Copolyester Plus 10 Parts Glyceryl Tribenzoate |
|---|---|---|
| Melt Index | 6.2 | 18 |

Metal-to-metal bonds are prepared from the copolyester modified with 10 parts glyceryl tribenzoate by application to clean, cold-rolled steel panels preheated to 450° F. These bonds are then tested by use of an Instron tester with a jaw movement speed of 5 inches per minute to give a lap shear strength of 980 pounds per square inch.

EXAMPLE 2

The copolyester described above (100 parts) is modified with 10 parts of neopentyl dibenzoate by compounding in a continuous Banbury mixer and extruding into pellets. This composition is then checked for melt index at 190° C. as follows:

| | Copolyester | Copolyester Plus 10 Parts Neopentyl Dibenzoate |
|---|---|---|
| Melt Index | 6.2 | 15 |

Bonds are made from this modification using clean, cold-rolled steel preheated to 450° F. These bonds are then tested by use of an Instron tester with a jaw movement of 5 inches per minute to give a lap shear strength of 1,120 pounds per square inch.

EXAMPLE 3

The copolyester described above is modified with 10 parts trimethyolethane tribenzoate by compounding in a continuous Banbury and subsequent extruding and pelletizing. This composition is checked for melt index at 190° C.

|  | Copolyester | Copolyester Plus 10 Parts Trimethylolethane Tribenzoate |
|---|---|---|
| Melt Index | 6.2 | 13 |

Lap shear bonds strengths are determined as in Example 1 and found to be 1440 psi.

EXAMPLE 4

The copolyester described above is modified with 10 parts triethylene glycol dibenzoate by compounding in a continuous Banbury and extruding into pellets. A melt index determination is made at 190° C. on this material.

|  | Copolyester | Copolyester Plus 10 Parts Triethylene Glycol Dibenzoate |
|---|---|---|
| Melt Index | 6.2 | 14 |

Bonds using cold-rolled, clean steel are made with this plasticized composition with the metal preheated to 450° F. Lap shear bond strengths are determined on an Instron tester at 5"/min. Bond strengths of 1280 psi are obtained.

In Examples 5-10, the copolyester alone and the modified copolyester are exposed at 425° F. for 2, 4, 6, 8 and 24 hours with subsequent I.V. determinations. These examples reveal breakdown in I.V. of the benzoic acid ester modifications over the unmodified copolyester after extended exposure to high temperature. It is believed that the breakdown in I.V. is possibly due to ester interchange. Unless suitable stabilizers are used, therefore, the adhesive should not be subjected to high temperatures for extended periods of time.

In other bonding applications, the copolyester is compared to the benzoic acid ester blends on substrates of wood, acrylo-nitrile-butadiene-styrene, fiberglass reinforced polyester, and steel. The bond strength of the blends is considerably lower than unplasticized copolyester, but still sufficiently high to be very effective.

Fabric hemming evaluations of the modified copolyester are made using unmodified copolyester as a control. The modified copolyester processed at lower temperatures than unmodified copolyester; however, smoke of the neopentyl glycol dibenzoate modification was noted. The glyceryl tribenzoate modified copolyester, with very slight smoke during application, showed comparable bond strength to the copolyester. The results of the hemming study are shown in Examples 11–39. Pillowcase type seams are made with a hot-melt hemming unit at 100 ft. per minute on a 65/35 polyester-cotton percale sheet, using 0.3 grams of adhesive per foot.

In the area of fabric interlining and garment labeling, the addition of 10% glyceryl tribenzoate or neopentyl glycol dibenzoate lowers the heat sealing temperatures of the copolyester from greater than 300° F. to 275° F.

Neopentyl glycol dibenzoate or glyceryl tribenzoate at approximately a 10% level will reduce the melt viscosity of the copolyester for a significantly lower application temperature and lower heat activation temperature for labeling and interlining. Neopentyl glycol dibenzoate is especially effective for labels and interlining with respect to heat sealing temperature, greater bond strength retention after laundering and dry cleaning, and the softness of the bond area.

EXAMPLES 5-10

I.V. Determinations after Exposure at 425° F.

| Example No. | Time at 425° F. | Copolyester | Copolyester + 10 Parts Neopentyl Glycol Dibenzoate | Copolyester + 10 Parts Glyceryl Tribenzoate |
|---|---|---|---|---|
| 5 | 0 hrs. | .79 | .72 | .72 |
| 6 | 2 hrs. | .62 | .53 | .53 |
| 7 | 4 hrs. | .61 | .45 | .47 |
| 8 | 6 hrs. | .60 | .44 | .46 |
| 9 | 8 hrs. | .61 | .43 | .44 |
| 10 | 24 hrs. | .64 | .40 | .34 |

| | Modified Copolyester for Hemming | | | |
|---|---|---|---|---|
| Example No. | Composition | Approximate Average Extruder Barrel Temp., °F. | "Grab" Strength (Lb.) Control | Laundered |
| 11 | Copolyester + 10 Parts | 450 | 26.4 | 16.5 |
| 12 | Neopentyl Glycol Dibenzoate | 450 | 26.6 | 19.2 |
| 13 | | 450 | 31.9 | 20.8 |
| 14 | | 500 | 23.8 | 17.0 |
| 15 | | 500 | 26.1 | 20.9 |
| 16 | | 550 | 24.5 | 19.6 |
| 17 | | 550 | 6.3 | 6.2 |
| 18 | Copolester + 5 Parts | 450 ⎫ | Melt Too Cold to Feed | |
| 19 | Neopentyl Glycol Dibenzoate | 450 ⎭ | From Die Properly | |
| 20 | | 450 | 29.7 | 17.5 |
| 21 | | 500 | 34.0 | 18.9 |
| 22 | | 500 | 32.8 | 16.7 |
| 23 | | 550 | 37.3 | 20.1 |
| 24 | | 550 | 38.9 | 20.5 |
| 25 | Copolyester + 10 Parts | 450 | 23.2 | 13.5 |
| 26 | Glyceryl Tribenzoate | 450 | 36.0 | 19.9 |
| 27 | | 450 | 32.9 | 18.5 |
| 28 | | 500 | 36.9 | 19.0 |

-continued

Modified Copolyester for Hemming

| Example No. | Composition | Approximate Average Extruder Barrel Temp., °F. | "Grab" Strength (Lb.) Control | "Grab" Strength (Lb.) Laundered |
|---|---|---|---|---|
| 29 | | 500 | 34.8 | 19.2 |
| 30 | | 550 | 32.5 | 13.2 |
| 31 | Copolyester + 5 Parts | 450 | 32.6 | 16.7 |
| 32 | Glyceryl Tribenzoate | 450 | 33.0 | 16.0 |
| 33 | | 450 | 31.4 | 14.7 |
| 34 | | 500 | 22.8 | 12.5 |
| 35 | | 500 | 27.7 | 15.8 |
| 36 | | 550 | 27.6 | 14.1 |
| 37 | | 550 | 32.1 | 15.4 |
| 38 | Copolyester alone (Control) | 550 | 24.0 | 15.1 |
| 39 | | 550 | 32.1 | 18.1 |

It will be evident to those skilled in the art that many different copolyester compositions characterized by mole ratios of terephthalic acid to adipic acid within the range of 60:40 to 80:20, mole ratios of ethylene glycol to 1,4-butanediol within the range of 60:40 to 80:20, and having an I.V. greater than 0.5, and preferably greater than 0.7, may be prepared within the scope of this invention. Such specific compositions can be successfully employed as melt adhesives for the bonding of a wide variety of substrates such as fabric, metal, glass, wood, rubber, plastic sheets and many other materials to produce bonds which will resist the action of heat, steam, dry cleaning solvents and the like under normal conditions of use of such bonded products. In the case of fabrics, the bonds produced by employing the compositions of our invention are also found to be sufficiently flexible to permit bending, flexing and other manipulations of the bonded fabric without cracking, or let goes or similar defects developing in the bonding layer. This property of flexibility makes possible the use of bonded fabrics which have many applications in the aircraft industry and in the manufacture of upholstered products.

The softening point test is carried out to determine the temperature at which any given copolyester composition, applied as a bonding agent between two substrates, softens sufficiently to allow the substrates to be pulled apart when one of the substrates is fixed and a given weight is attached to the other. This test is essentially the same as the so-called "Peel Test" described in detail herein, except that the temperature is elevated at a programmed rate.

Typical softening points and inherent viscosities of polyesters disclosed herein appear in the following table.

| | Mole Percent of Acid and Glycol Component | | | |
|---|---|---|---|---|
| Copolyester | Terephthalic Acid/Adipic Acid | Ethylene Glycol/1,4-Butanediol | Softening Point, °C. | I.V. |
| 1 | 60:40 | 60:40 | 80–85 | 1.27 |
| 2 | 70:30 | 70:30 | 130–135 | 1.09 |
| 3 | 80:20 | 80:20 | 153–158 | 1.16 |

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. An improved hot melt adhesive composition comprising a copolyester of terephthalic acid or derivatives thereof; adipic acid or derivatives thereof; ethylene glycol or derivatives thereof; and 1,4-butanediol or derivatives thereof, wherein the acid components and the diol components are present in a 1:1 molar ratio, said copolyester having a mole ratio of terephthalic acid to adipic acid within the range of about 60:40 to about 80:20, a mole ratio of ethylene glycol to 1,4-butanediol within the range of about 60:40 to about 80:20, a softening point within the range of about 80°–160° C., and an inherent viscosity of at least 0.5 as measured at 25° C. using 0.25 grams of copolyester per 100 ml. of a solvent consisting of 60 percent by weight phenol and 40 percent by weight tetrachloroethane, and a modifying amount of a compound selected from glyceryl tribenzoate, triethylene glycol dibenzoate, trimethylolethane tribenzoate, and neopentyl dibenzoate.

2. The composition of claim 1 bonded to at least one substrate.

3. The composition of claim 1 wherein the inherent viscosity is at least 0.7.

4. The composition of claim 1 wherein the mole ratio of terephthalic acid to adipic acid is about 75:25 and the mole ratio of ethylene glycol to 1,4-butanediol is about 75:25.

5. The composition of claim 1 wherein said modifier is present in an amount of between about 1 and about 35 parts per hundred parts polyester.

6. The composition of claim 1 wherein said modifier is present in an amount of between about 5 and about 15 parts per hundred parts modifier.

7. The composition of claim 1 wherein said modifier is glycerol tribenzoate.

8. The composition of claim 1 wherein said modifier in neopentyl dibenzoate.

9. The composition of claim 1 wherein said modifier is triethylene glycol dibenzoate.

10. The composition of claim 1 wherein said modifier is trimethylolethane tribenzoate.

* * * * *